(12) United States Patent
Anthon

(10) Patent No.: US 6,510,833 B1
(45) Date of Patent: Jan. 28, 2003

(54) FUEL SAVING COMBUSTION ENGINE INSULATION METHOD AND SYSTEM

(75) Inventor: Anthony Anthon, Boca Raton, FL (US)

(73) Assignee: American Diesel & Gas, Inc., Boca Raton, FL (US)

( * ) Notice: Subject to any disclaimer, the term of this patent is extended or adjusted under 35 U.S.C. 154(b) by 0 days.

(21) Appl. No.: 10/029,339

(22) Filed: Dec. 20, 2001

(51) Int. Cl.⁷ .................................................. F02B 77/00
(52) U.S. Cl. .................................................. 123/198 E
(58) Field of Search .................... 123/198 E, 198 R, 123/1 R, 41.01

(56) References Cited

U.S. PATENT DOCUMENTS

| | | |
|---|---|---|
| 3,439,657 A | 4/1969 | Gratzmuller |
| 4,311,009 A | 1/1982 | Elsbett et al. |
| 4,550,692 A | 11/1985 | Crofts |
| 4,960,096 A | 10/1990 | Sukumoto |
| 5,269,143 A * | 12/1993 | Cikanek et al. ............... 60/599 |
| 5,375,580 A | 12/1994 | Stolz et al. |
| 5,603,297 A * | 2/1997 | Wolf et al. ............ 123/195 C |
| 5,775,450 A * | 7/1998 | Porter et al. ............... 180/68.1 |
| 5,806,480 A | 9/1998 | Meada et al. |
| 5,833,504 A | 11/1998 | Ikeya et al. |
| 5,927,254 A | 7/1999 | Ino et al. |
| 5,987,882 A * | 11/1999 | Voss et al. .................... 60/274 |
| 6,024,188 A | 2/2000 | Yamaguchi et al. |
| 6,182,643 B1 | 2/2001 | Canopy |
| 6,314,949 B1 | 11/2001 | DeGrazia |

FOREIGN PATENT DOCUMENTS

| | | | |
|---|---|---|---|
| GB | 437078 | 10/1935 | |
| GB | 08222537 A * | 8/1982 | .......... F02M/53/00 |

* cited by examiner

*Primary Examiner*—Bibhu Mohanty
(74) *Attorney, Agent, or Firm*—Malin, Haley & DiMaggio, P.A.

(57) ABSTRACT

An apparatus for reducing fuel consumption in an internal combustion engine such as a diesel engine used in a truck compartment, comprising a thermal insulation cover that also includes reflective fabric over the exhaust manifold, around the intake plenum for intake air and intake air box, covering the turbocharger compressor with a heat insulating material that includes a reflective fabric layer and the turbocharger drive turbine housing except for the bearing area in order to greatly reduce heat build up in the truck engine compartment thereby reducing intake air temperature for increased engine efficiency.

1 Claim, 4 Drawing Sheets

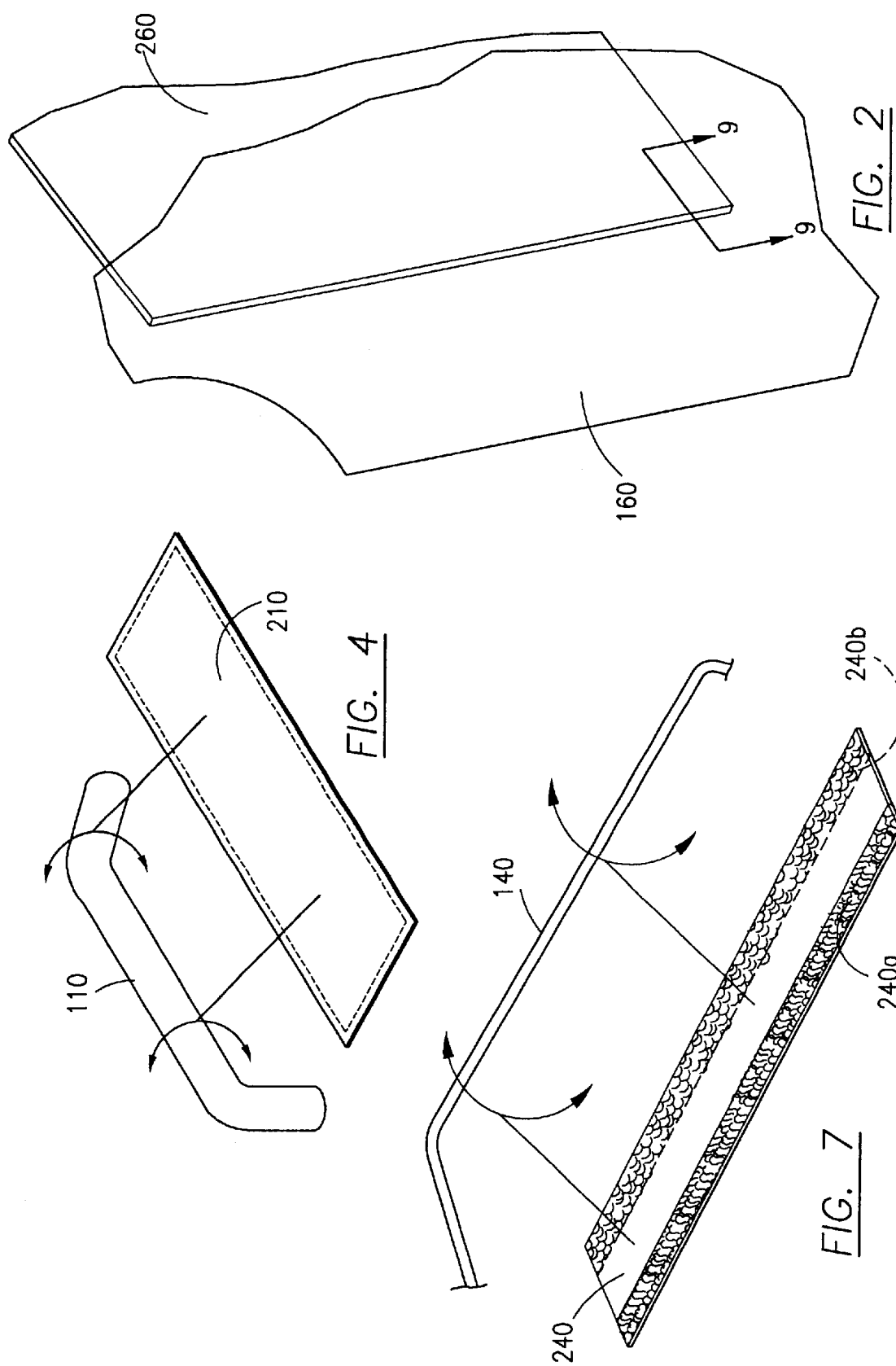

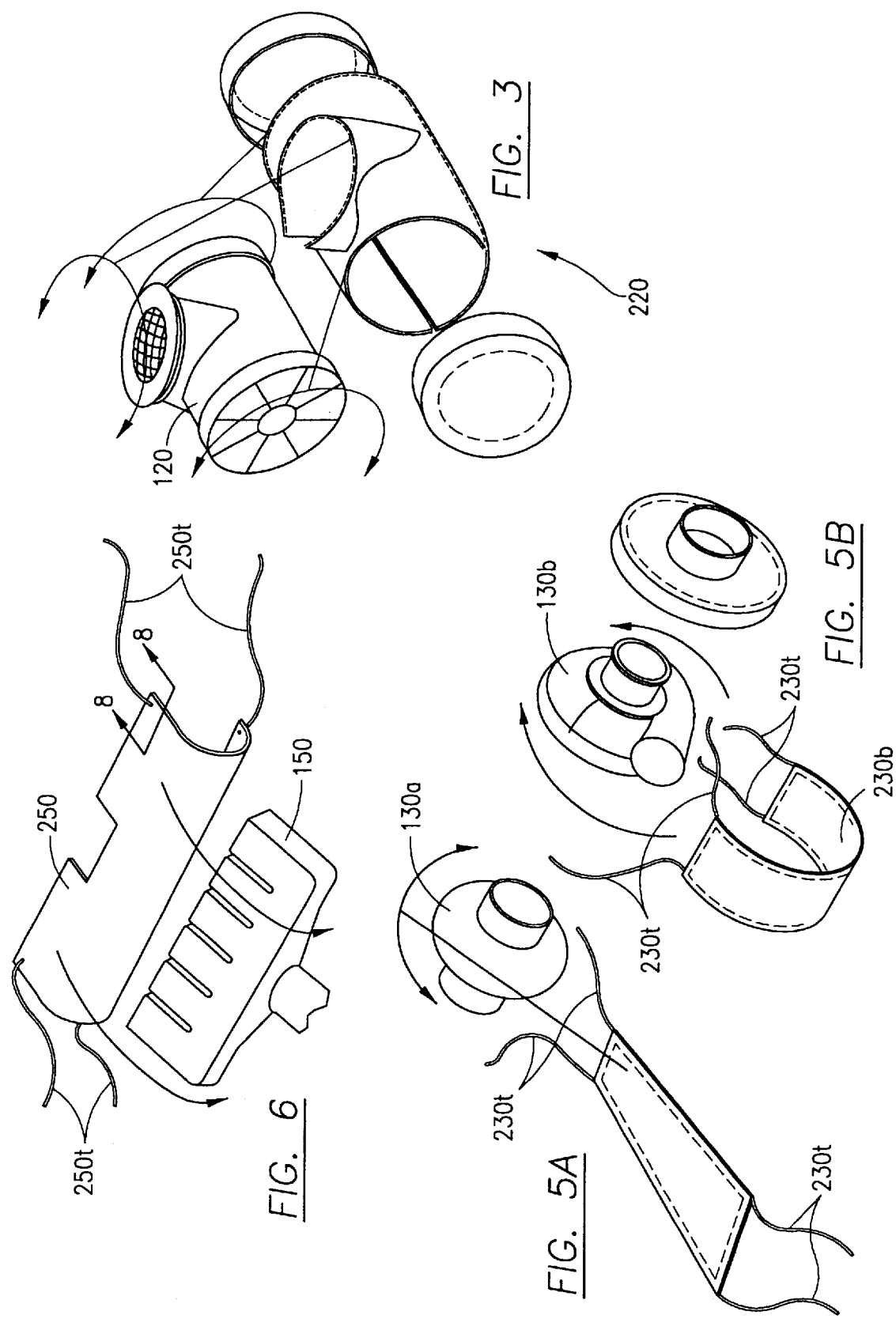

FUEL SAVING COMBUSTION ENGINE INSULATION METHOD AND SYSTEM

BACKGROUND OF THE INVENTION

1. Field of the Invention

The present invention relates to a method and apparatus for improving the fuel efficiency of an internal combustion engine, and specifically to a method and apparatus to minimize, reduce and lower the operational combustion engine compartment temperature to maintain relatively low intake air temperature in order to achieve improved combustion engine efficiency and reduced fuel consumption without reducing engine performance.

2. Description of Related Art

Internal combustion engines are used to power vehicles such as cars and trucks. Internal combustion engines utilize air and fuel to create a combustion charge which is burned to create rotary movement of a crank shaft. The rotation of the crank shaft is used to propel the vehicle and power other systems on the vehicle.

An internal combustion engine generally includes an engine block having at least one combustion chamber, an air intake port, an air intake manifold connected to the air intake port and an exhaust port connected to an exhaust manifold. Air is fed to the air intake manifold by an intake plenum. Air is mixed with fuel creating a charge within the intake manifold which is drawn into the engine block by the expansion of a combustion chamber. The charge is compressed and burned by the combustion chamber. The products of the burned charge are released from the engine block through the exhaust port and travel through the exhaust manifold which is normally connected to a muffler.

When used to power a car or truck, the combustion engine is normally located towards the front of the car or truck within an engine compartment formed by an engine bay which is covered by a hood. The combustion of fuel within an engine block (which is iron or aluminum) creates a large amount of heat which is conducted and radiated within the engine compartment. This heat productivity causes the intake manifold and intake plenum in the engine compartment to be continuously heated which increases the temperature of the intake air delivered to the engine, reducing engine gasoline and diesel fuel efficiency.

Some engines used to power cars or trucks utilize turbochargers. Turbochargers use the velocity of the exhaust gases expelled from the engine block to rotate a compressor which compresses the intake air delivered to the intake manifold above atmospheric pressure. The pressurized air allows the engine to operate more efficiently by providing a charge with increased density. Turbochargers by their nature create additional radiant heat energy within the engine compartment by providing an increased surface area for exhaust heat to emanate and increasing the time the exhaust gases spend within the engine compartment as they are forced to follow a longer path in order to turn a compressor.

It is known to attempt to reduce the temperature in the engine compartment to allow a person to work on an engine while the engine is running without subjecting the person to the dangers of being burned. Some areas of an engine compartment are covered by heat protectors to reduce the heat that radiates from the engine.

The present invention is especially useful in a large truck diesel engine to greatly improve fuel efficiency by significantly reducing the temperature of the ambient air within the engine compartment by insulating heat producing components as well as the intake plenum.

Prior art methods of decreasing the heat generated within the engine compartment include insulating wraps which are wrapped around exhaust headers such as those manufactured by Design Engineering, Inc. and Cool It Thermo Tec. These wraps are formed by high temperature fiber wraps which are used to insulate exhaust headers. These wraps are applied to an exhaust header by wrapping them around the tubes that comprise the header and securing it in such fashion with clamps. Additionally, those conventional wraps are designed to prevent radiant heat from escaping rather than preventing radiant heat from entering.

What is needed is a method and a system for thermally insulating both conductive and radiant heat generating engine parts including turbochargers and exhaust headers to reduce the heat radiated within the engine compartment. Also the intake air box and intake air plenums are covered with thermal insulation to reduce the heating of the intake air delivered to the engine so that the overall efficiency of the engine is increased. The present invention provides a system for reducing conductive and radiant heat generated within the engine compartment and to reduce the temperature of the intake air delivered to the engine via the intake air box and intake plenum.

BRIEF SUMMARY OF THE INVENTION

A method and system for increasing diesel combustion engine efficiency and reducing fuel consumption in a large truck diesel engine with a turbocharger that includes lowering intake air temperatures by reducing engine compartment heating. The exhaust manifold is covered with thermal insulation layers forming a thermal shield to reduce engine compartment heat. The turbocharger compressor and turbine are both covered with thermal insulation layers except for the bearing location to reduce engine compartment heat, the intake air box and intake plenum are covered with a light weight reflective insulation to prevent heating of the intake air. The engine compartment hood is also insulated to prevent heat build up that would cause increased compartment heating. By insulating many components that produce and radiate heat, the overall efficiency of an engine can be greatly increased by reducing the heating of the intake air.

Exhaust manifold multi-layered thermo shields are used to thermally insulate the exhaust manifold to reduce the heat radiated from the exhaust manifold into the engine compartment. The shield is wrapped around the exhaust manifold so that most of the manifold is insulated. The heat insulating and radiating materials used to cover the exhaust manifold include a thermal insulating layer of manning glass, a thermal insulating layer of heavy stevens cloth, a wire mesh layer adjacent the stevens cloth to prevent cloth wear, and a top layer of a heat reflecting fabric such as aluminum coated fibers known as GENETEX to reflect engine compartment heat. The layered insulating materials form a laminate insulating shield that is cut and shaped to effectively cover thermally the exhaust manifold to reduce engine compartment heat while being a relatively light weight shield that is resilient and flexible enough to be shaped about the top of the manifold headers and held firmly in place by wires or safety straps.

The turbocharger is insulated with a thermal insulation shield of the same materials as the exhaust manifold above also using individual layers of manning glass and stevens cloth. A wire mesh layer is also used to prevent wear on the insulation from vibration. The outer layer is also an aluminum fabric known as GENETEX that reflects heat. Since the turbocharger compressor is somewhat cylindrical, the insulating layered shield is cylindrical to fit substantially around and over the compressor secured by peripheral wires. The turbine housing of the turbocharger is likewise covered with the same thermal insulation materials as the exhaust manifold and secured by peripheral wires. However the external area of the turbine housing near the bearings is not covered to protect the bearings from overheating. The insulation shield is held in place by wire ties. Thus, two separate thermo shields are used on the turbocharger.

The hood is insulated with a layer of manning glass and a layer of planar aluminum foil that is fixed by adhesive to the hood surface.

The air intake passage and air intake plenum are thermally insulated with a layer of manning glass and an outside layer of aluminum foil which is affixed by an adhesive to the outside housing of the passages and plenum.

The fuel lines are insulated to reduce the heat that they absorb to prevent fuel vapor lock.

By greatly reducing the ambient and radiated heat built up within the engine compartment, the heating of the intake air is significantly reduced relative to the traditional temperatures present from engine compartment heat, greatly improving fuel efficiency and reducing fuel consumption. Reducing the temperature of the intake air increases engine efficiency. Reducing the radiant heat within the engine compartment and insulating fuel lines also eliminates the potential for vapor lock which is caused by the heating and subsequent boiling of fuel within the fuel lines.

Fifteen to twenty percent savings in fuel consumption has been achieved on Detroit Diesel Truck Series 60 engines using the method and system of the present invention.

In accordance with these and other objects which will become apparent hereinafter, the instant invention will now be described with particular reference to the accompanying drawings.

BRIEF DESCRIPTION OF THE DRAWINGS

FIG. 2 shows a perspective view, partially cut away and exploded of the thermo-insulating shield used with the hood of a vehicle for insulation.

FIG. 3 shows a perspective view of representative insulation shield for intake air box in an exploded view.

FIG. 4 shows a perspective view of an intake plenum exploded with a thermal insulation shield that can be wrapped around the intake air plenum.

FIGS. 5a and 5b show the insulating shields in perspective, that are used (partially exploded) for the turbo charger broken into two segments for the turbine (FIG. 5a) and for the compressor (FIG. 5b).

FIG. 6 show an exploded view of the exhaust manifold and insulating shield used.

FIG. 7 is a perspective exploded view of a fuel line with a thermal panel illustrating how the thermal panel is wrapped around the fuel line and secured using hook and lock fasteners.

DETAILED DESCRIPTION OF THE INVENTION

Figure 1:
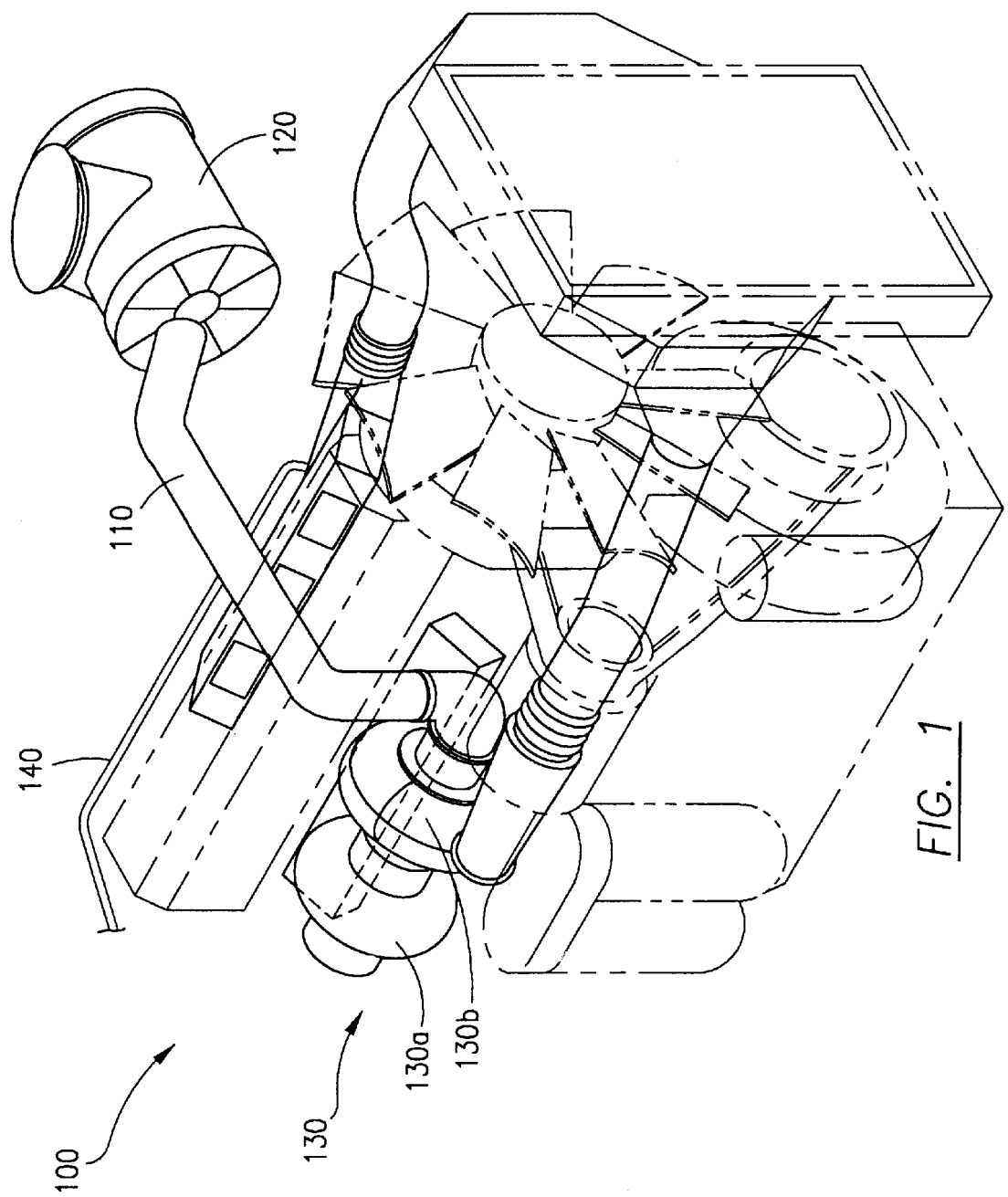
FIG. 1 shows a perspective view, partially in phantom, of a combustion engine that includes a turbo charger and intake air plenum.

Referring now to FIG. 1 a representative conventional diesel engine 100 is shown. The components include an intake air box 120, intake air plenum 110, turbocharger 130, fuel lines 140 which is connected to the turbo charger compressor 130b. The turbocharger 130 includes a compressor 130b to compress intake air to raise the air pressure above ambient and a driving turbine 130a that utilizes exhaust gases to drive compressor 130b. The engine block is attached to an exhaust manifold seen in FIG. 6. Other components of diesel engine 100 fuel lines and an intake manifold. The engine is mounted in the engine compartment and covered by a metal access hood. The example that was tested is a Detroit Diesel 60 Series engine which is a six cylinder engine built by DETROIT DIESEL having large horsepower. The engine components generate large amounts of heat which radiate into the engine compartment continuously. The present invention is a method that provides for installation of exhaust manifold and turbo charger component insulation wrap, insulation shields between radiant heat producing engine parts and intake parts, intake air insulation shielding, hood reflective thermal insulation and fuel line insulation. By insulating all components that radiate heat and those parts that absorb unwanted heat, the overall efficiency of the engine is greatly increased by reducing the heating and relative temperature of the intake air coming into the turbo charger 130 and subsequently burned.

Exhaust manifold insulation wrap 250 is used to insulate the exhaust manifold 150. The exhaust gasses from the combustion of fuel and air exit the engine block passing through the exhaust manifold 150. To reduce heat radiated by the exhaust manifold 150, exhaust manifold insulation wrap is tied to the exhaust manifold using stainless steel wire ties 250t or other suitable heat impervious wire. The exhaust manifold insulation wrap 250 is shaped to properly conform to the surface of the exhaust manifold 150 for efficient reflection and insulation of heat radiated from exhaust manifold 150 as well as ease of attachment. Stainless steel wire ties 250t are passed through sleeves or holes within exhaust manifold insulation wrap 250 and passed around exhaust manifold 150. Both ends of wire ties 250t are secured by twisting the two together so that exhaust manifold insulation wrap 250 is secured so that it substantially covers exhaust manifold 150.

Figure 8:
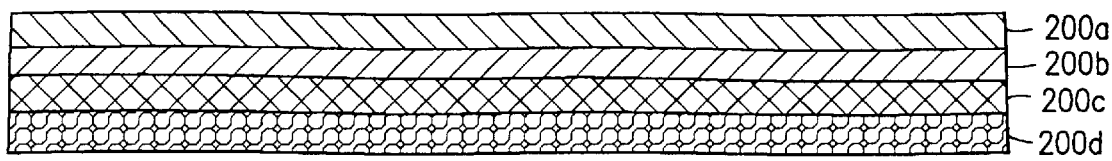
FIG. 8 shows a side elevational, cross sectional view of the laminate insulating shield showing the layered materials that form the shield which covers the exhaust manifold and the turbo charger.

Exhaust manifold insulation wrap 250 is constructed from a laminated insulation blanket formed by four different material layers as seen in FIG. 8. A reflective aluminized heat impervious fabric know as GENETEX forms the first outside layer 200a which faces outward of the exhaust manifold. A heat impervious fiberglass insulation layer with high insulation properties known as MANNING GLASS forms the second layer 200b. The third layer 200c is formed by a fiberglass wrap known as STEVENS CLOTH. The fourth layer 200d is formed by heat impervious wire mesh which faces exhaust manifold 150. These layers are arranged to reduce the heat radiated by the exhaust manifold 150 by first reflecting the radiated heat and reducing radiated heat which cannot be reflected.

Turbocharger 130 is insulated with the same laminate insulation as the exhaust manifold 150. The turbocharger is comprised of drive turbine 130a connected by a drive shaft to a compressor 130b. The exhaust gases from the engine combustion of fuel and air exit the engine block passing through the exhaust manifold 150 and are used to drive compressor 130b by passing through the drive turbine 130a. Compressor 130b compresses the intake air so that a more dense combustion charge is produced at a higher pressure than ambient. To reduce heat radiated by turbocharger 130, drive turbine insulation wrap 230a and compressor insulation wrap 230b are wrapped around the housing of turbine 130a and housing of compressor 130b. Drive turbine insulation wrap 230a and compressor insulation wrap 230b are attached using stainless steel wire 230t or other suitable heat impervious wire. Each turbo insulation wrap 230a and compressor wrap 230b are circular in shape so that they properly conform to the surface of the turbine 130a and compressor 130b for efficient reflection and insulation of radiant heat as well as ease of attachment. Stainless steel wire ties 230t are passed through sleeves which extend along opposite lengthwise edges of drive turbine insulation wrap 230a and compressor insulation wrap 230b. Drive turbine insulation wrap 230a is wrapped around turbine 130a and wire ties 230t are pulled tight so that drive turbine insulation wrap 230a becomes circular in shape and conforms in shape to turbine 130a, effectively covering turbine 130a. The opposite ends of the wire ties 230t which secure drive turbine insulation wrap 230a are secured together by twisting the two together. Compressor insulation wrap 230b is wrapped around the compressor 130 in the same fashion as drive turbine insulation wrap 230a and wire ties 230t are pulled tight so that compressor insulation wrap 230b becomes circular in shape and conforms to the shape of compressor 130b, effectively covering compressor 130b. The opposite ends of wire ties 230t which secure compressor insulation wrap 230b are secured together by twisting the two together. The shape of the compressor insulation wrap 230b is adapted so that the area adjacent to the bearings of compressor 230b are not covered to prevent overheating the bearings. Similarly, the shape of the drive turbine insulation wrap 230a is adapted so that the area adjacent to the bearings of drive turbine 230a are not covered to prevent overheating of the bearings.

Drive turbine insulation wrap 230a and compressor insulation wrap 230b are constructed from the same laminated insulation fabric which forms exhaust manifold insulation wrap 250 as seen in FIG. 8. A reflective aluminized heat impervious fabric known as GENETEX forms the first outside layer 200a which faces outward of the exhaust manifold. A heat impervious fiberglass insulation layer with high insulation properties known as MANNING GLASS forms the second layer 200b. The third layer 200c is formed by fiberglass wrap known as STEVENS CLOTH. A fourth layer, 200d is formed by heat impervious wire mesh which faces exhaust manifold 150. These layers are arranged to reduce the heat radiated by the turbocharger drive turbine 130a and compressor 130b as well as reflecting any heat that may be absorbed by the turbocharger from the exhaust manifold 150 by first reflecting the radiated heat by the exhaust manifold 150 as well as insulating the turbine 130a and compressor 130b.

The fuel lines 140 are insulated by fuel line insulation 240 which is wrapped around the fuel lines 140 and secured using hook and lock fasteners 240a and 240b. Fuel line insulation 240 is constructed from a two layer laminate. The fuel line insulation wrap 240 comprises an outside layer and an inside layer. The outside layer is formed by reflective aluminized fabric know as GENETEX and the inside layer is formed by insulation fabric know as STEVENS CLOTH.

By using aluminized fabric and insulation fabric around fuel lines 140, heat absorbed into fuel lines 140 is reduced. The outside layer reflects heat radiated within the engine compartment, while the inside layer insulates the fuel lines 140 from heat which cannot be reflected. By insulating the fuel lines 140 the potential for fuel vapor lock within the fuel lines 140 is reduced.

Figure 9:
FIG. 9 shows a side elevational, cross sectional view of the laminate used as a thermal insulating shield for the intake air plenum, intake air box and the hood.

Hood 160 is insulated by hood insulation 260. Hood insulation 260 is formed by a three layer laminate having a first layer 260 formed by reflective aluminum foil that reflects heat, a second layer 260b formed by insulation known as MANNING GLASS and a third layer 260c formed by an adhesive backing as seen in FIG. 9. Hood insulation 260 is pliable so that it may easily conform to the shape of the hood 160. Hood insulation 260 is secured to hood 160 by an adhesive backing 260c for easy installation. First layer 260a of hood insulation 260 is reflective and faces engine 100 so that the heat is reflected within the engine compartment. The second layer 260b of hood insulation 260 insulates so that heat generated by the heating of hood 160 by the sun does not radiate into the engine compartment.

Plenum insulation wrap 210 is used to insulate intake plenum 110 and air box insulation wrap 220 is used to insulate intake air box 120. Intake plenum 110 carries intake air from intake air box 120 to turbocharger 130. Intake air fed to turbocharger 130 is used to create the intake charge which is burned within engine 100. Insulating intake plenum 110 and intake air box 120 reduces the heating of the intake air by the heat radiated by exhaust manifold 150 and turbocharger 130.

Plenum insulation wrap 210 and air box insulation wrap 220 are constructed from the same laminate which forms hood insulation 260. Plenum insulation wrap 210 and air box insulation wrap 220 are formed by a three layer laminate having a first layer 260a formed by reflective aluminum foil that reflects heat, a second layer 260b formed by insulation known as manning glass and a third layer 260c formed by an adhesive backing as seen in FIG. 9. These layers are arranged to reduce the heat absorbed by intake plenum 110 and intake air box 120 and the subsequent heating of the intake air. The first layer 260a first reflects the radiant heat within the engine compartment, the second layer reduces the radiated heat which can not be reflected, and the third layer affixes the plenum insulation wrap 210 and air box insulation wrap 220 to the intake plenum 110 and intake air box 120.

Plenum insulation wrap 210 is wrapped around intake plenum 110 and affixed by adhesive third layer 260c to intake plenum 110. Similarly, air box insulation wrap 220 is wrapped around intake air box 120 and affixed by adhesive third layer 260c. One or more pieces of plenum insulation wrap 210 or air box insulation wrap 220 may be used to insulate intake plenum 110. Plenum insulation wrap 210 and air box insulation wrap 220 are shaped to properly conform to the surface of intake plenum 110 and intake air box 220 so that the entire intake plenum 110 and intake air box 120 are covered and properly insulated. The shape of the plenum insulation wrap 210 and air box insulation wrap 220 assures efficient reflection of radiant heat as well as ease of attachment.

By greatly reducing the ambient and radiated heat built up within the engine compartment the heating of the intake air is reduced. The heating of the intake air is further reduced by the insulation of intake air box 120 and intake plenum 110. Fifteen to twenty percent savings in fuel consumption has been achieved on Detroit Diesel Truck Series 60 engines using this method. Fuel savings on trucks used for several weeks in normal working environment achieved 10–15% improvement in fuel efficiency.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. A system for greatly improving the reduction of fuel consumption in a diesel internal combustion engine used in a truck comprising:

exhaust manifold insulation formed by a laminate that includes a radiating fabric, a thermal heat insulating fabric, a thermal insulating wrap and a wire mesh fabric joined together in a laminate and sized and shaped to cover the exhaust manifold of a diesel internal combustion engine mounted in a truck compartment to reduce compartment heating;

drive turbine insulation wrap sized and shaped to cover a drive turbine of a turbocharger used on a diesel internal combustion engine in a truck compartment formed by a laminate that includes a radiating fabric, a thermal heat insulating fabric, a thermal insulating wrap and a wire mesh fabric joined together in a laminate and sized and shaped to cover said drive turbine, said drive turbine insulation wrap having an area left uncovered near the bearings of said drive turbine;

compressor insulation wrap sized and shaped to cover a compressor of a turbocharger used on a diesel internal combustion engine in a truck compartment formed by a laminate that includes a radiating fabric, a thermal heat insulating fabric, a thermal insulating wrap and a wire mesh fabric joined together in a laminate and sized and shaped to cover the said compressor;

plenum insulation wrap for covering the intake air plenum on a diesel internal combustion engine that transports ambient air to the turbo charger formed by a laminate that includes a radiating aluminum foil, a thermal heat insulating fabric and an adhesive layer;

air box insulation wrap for covering the intake air box that gathers ambient air from outside the engine compartment of a diesel internal combustion engine formed by a laminate that includes a radiating aluminum foil, a thermal heat insulating fabric and an adhesive; and hood insulation for covering the inside of the hood of a diesel internal combustion engine formed by a laminate that includes a radiating aluminum foil, a thermal heat insulating fabric and an adhesive, attached to the hood facing an engine compartment for thermally insulating said hood.

* * * * *